US011196762B2

(12) United States Patent
dos Santos Silva et al.

(10) Patent No.: US 11,196,762 B2
(45) Date of Patent: Dec. 7, 2021

(54) VULNERABILITY SCANNER BASED ON NETWORK PROFILE

(71) Applicant: International Business Machines Corporation, Armonk, NY (US)

(72) Inventors: Bruno dos Santos Silva, McKinney, TX (US); Shawn Snodgrass, Almere (NL); Diogo Tadeu Silva De Araujo, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 16/527,654

(22) Filed: Jul. 31, 2019

(65) Prior Publication Data

US 2021/0037039 A1 Feb. 4, 2021

(51) Int. Cl.
*H04L 29/06* (2006.01)

(52) U.S. Cl.
CPC ........ *H04L 63/1433* (2013.01); *H04L 63/102* (2013.01); *H04L 63/1416* (2013.01); *H04L 63/1425* (2013.01); *H04L 63/1441* (2013.01); *H04L 63/20* (2013.01)

(58) Field of Classification Search
None
See application file for complete search history.

(56) References Cited

U.S. PATENT DOCUMENTS

| 6,205,552 | B1 | 3/2001 | Fudge | |
|---|---|---|---|---|
| 2006/0026273 | A1* | 2/2006 | Comay | H04L 63/1416 709/223 |
| 2013/0055246 | A1* | 2/2013 | Li | G06F 9/45558 718/1 |
| 2017/0116421 | A1* | 4/2017 | M C | G06F 16/23 |
| 2017/0264631 | A1 | 9/2017 | Eggert | |
| 2018/0124094 | A1 | 5/2018 | Hamdi | |
| 2018/0124096 | A1* | 5/2018 | Schwartz | H04L 63/1425 |
| 2019/0362078 | A1* | 11/2019 | Inagaki | G06F 3/04817 |
| 2019/0370472 | A1* | 12/2019 | Hodgman | G06F 21/577 |

OTHER PUBLICATIONS

"NETSTAT(8)," Linux System Adminstrator's Manual, Linux manpages project, Oct. 2014, 8 pages.
"Routing table," Wikipedia, Mar. 2019, 4 pages.

* cited by examiner

*Primary Examiner* — Joseph P Hirl
*Assistant Examiner* — Hassan Saadoun
(74) *Attorney, Agent, or Firm* — VanLeeuwen & VanLeeuwen; Jeffrey S. LaBaw

(57) ABSTRACT

An approach is provided for vulnerability scanning that receives network access data from a secure network connection and stores the data in a memory. The set of network access data pertain to a set of network accessible resources. The set of network accessible resources are then accessed using the set of received network access data. A vulnerability scan is performed of the network accessible resources after which the access to the set of network accessible resources is released and the set of network access data is deleted from the memory.

15 Claims, 5 Drawing Sheets

VULNERABILITY SCANNER BASED ON NETWORK PROFILE

BACKGROUND

A vulnerability scanner is a computer program designed to assess computers, networks or applications in order to discover the weaknesses of a given system. Vulnerability scanners are used to identify a variety of vulnerabilities including those found based on poor configurations or flawed programming within a network-based asset such as a firewall, router, web server, application server, and the like. Scanners can perform both authenticated and unauthenticated scans. Some vulnerability scanners are available as "Software as a Service" (SaaS) with such services being provided over the Internet and delivered to the user as a web application. Modern vulnerability scanners are often quite powerful, and some have the ability to customize vulnerability reports as well as report on the installed software, open ports, certificates and other host information that can be queried as part of the scanner's processing.

As customers use vulnerability scanners to map and mitigate risks across the customer's infrastructure, vulnerability scanners are used to help automate the process and providing insight into vulnerabilities that need to be mapped and reported back to decision makers of the organization so that they can be properly addressed. Because of their wide-ranging access, vulnerability scanners themselves become a point of possible compromise given that the scanners are often provided full access to a wide variety of networks and resources that are being scanned. Unique firewall rules are often established to provide the scanners with proper access to ports and network resources needed to allow the scanner to provide accurate results. This broad access makes vulnerability scanners an attractive target to malevolent users, such as hackers, that wish to access or otherwise harm the customer's network resources without the customer's knowledge or permission.

SUMMARY

An approach is provided for vulnerability scanning that receives network access data from a secure network connection and stores the data in a memory. The set of network access data pertain to a set of network accessible resources. The set of network accessible resources are then accessed using the set of received network access data. A vulnerability scan is performed of the network accessible resources after which the access to the set of network accessible resources is released and the set of network access data is deleted from the memory.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
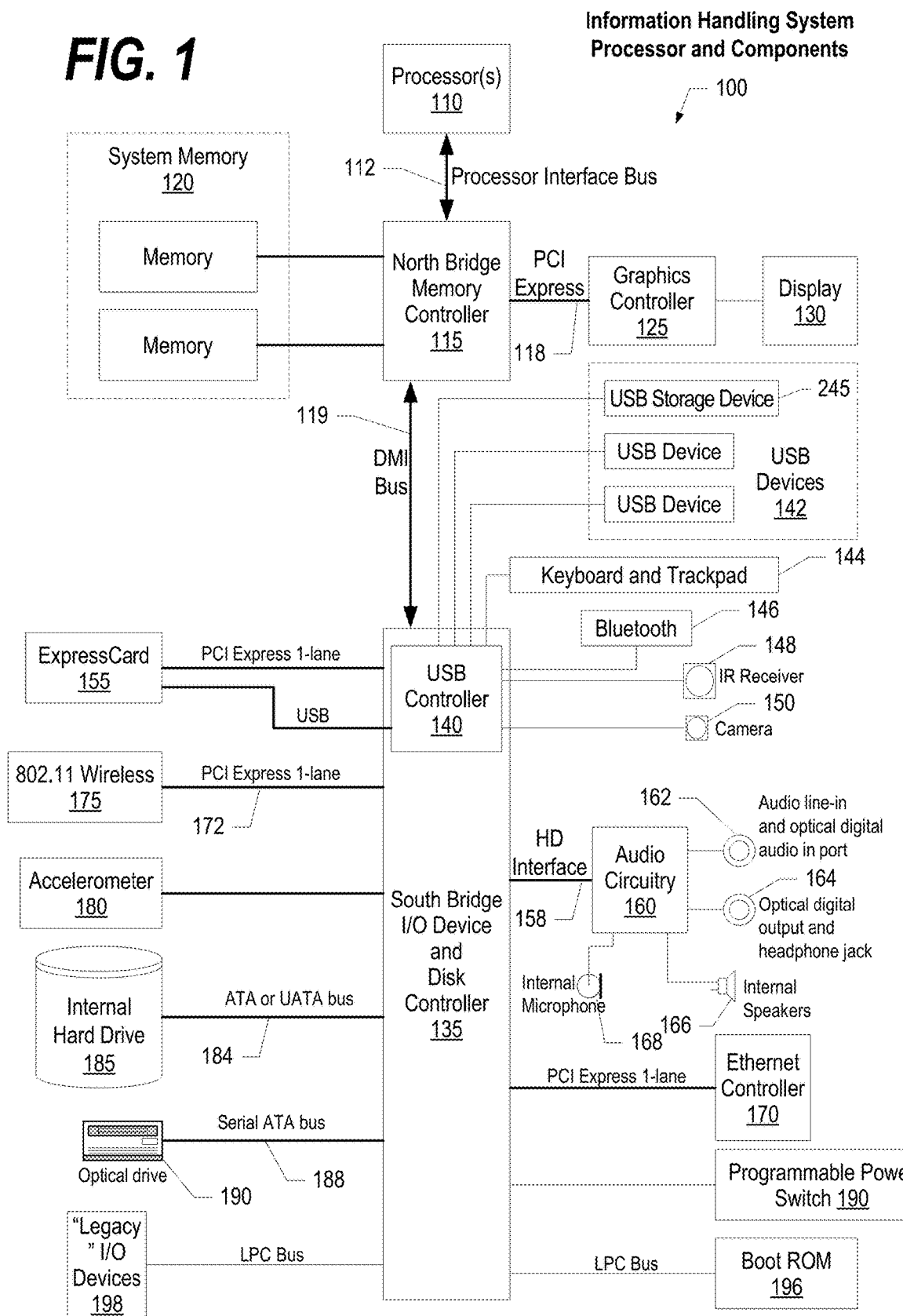
FIG. 1 depicts a network environment that includes a knowledge manager that utilizes a knowledge base.

FIGS. 1-5 describe an approach that limits security exposures from traditional vulnerability scanners by introducing a vulnerability controller that controls the extent and duration of network resources accessible by the scanners. The approach determines, using a scanner profile and the scanner's network resource needs, which network interfaces are required by the scanner. The approach disables the scanner's access to such network resources once the vulnerability scanner has completed its operations, thus providing a mechanism that prevents a single scanner from having long term access to a wide variety of network segments.

In one embodiment, the approach uses three primary components. First, a vulnerability scanner is a component that uses multiple network interfaces to scan multiple network segments with different IP addresses using a routing table. Second, a vulnerability scanner controller component is a component that selectively, based on a network routing schema, assigns interfaces to be used with the vulnerability scanner profile and disables such access from the vulnerability scanner when access is no longer needed. Third, a database component is a database that mimics the Routing Information Base (RIB) to form a Vulnerability Routing Information Base (VRIB). The VRIB is used to map the scanned assets from the profile with the RIB to determine which interface should be enabled and provided to the vulnerability scanner on an "as needed" basis."

In one embodiment, existing vulnerability scanner architectures are used for implementation in organizational environments. Initially, a database schema is created to enable the VRIB at the application level with the VRIB being maintained by the vulnerability controller that keeps track of the vulnerability scanners, the networks, and the vulnerability profiles. After initializing the VRIB database, the approach populates the database by connecting through a secure (e.g., SSL, etc.) tunnel that is established between the vulnerability controller and the vulnerability scanner. The controller queries the networks at the operating system (OS) level using an available network statistics tool (e.g., "netstat -rn", etc.). The information from the network statistics tool splits the keys and inserts them in the VRIB database using a function.

A profile is created and identifies the network resources that are to be scanned. When the profile is created, a function is performed that utilizes a database query to map the network interface to the VRIB database to include the proper network interface in the database. When the proper network is found, a query to update the VRIB with the network interfaces is executed. At this point, all the fields of the VRIB exist and the VRIB database can now be used as a reference by the vulnerability controller to instruct vulnerability scanners to perform various scans with the vulnerability scanners being provided network accesses, by the controller, so that the scanners can perform the desired scans. The approach searches the VRIB database and issues a command to the vulnerability scanner that enables the interface in the scanner on the OS level so that the network is accessible from the vulnerability scanner.

Once the scanner finishes the scan, the vulnerability controller sends a message to the scanner to disable the network interface that was used by the scanner. In this manner, if a nefarious user gains unauthorized access to the vulnerability scanner, the vulnerability scanner's network access is disabled or greatly limited and thereby thwarts the nefarious user's ability to harm or access the customer's network and network resources using the vulnerability scanner. In one embodiment, a traditional vulnerability scanner is modified so that sensitive information, such as network interfaces that might include credential information used to access the networks, is not retained in the vulnerability scanner's memory after the vulnerability scan has been completed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
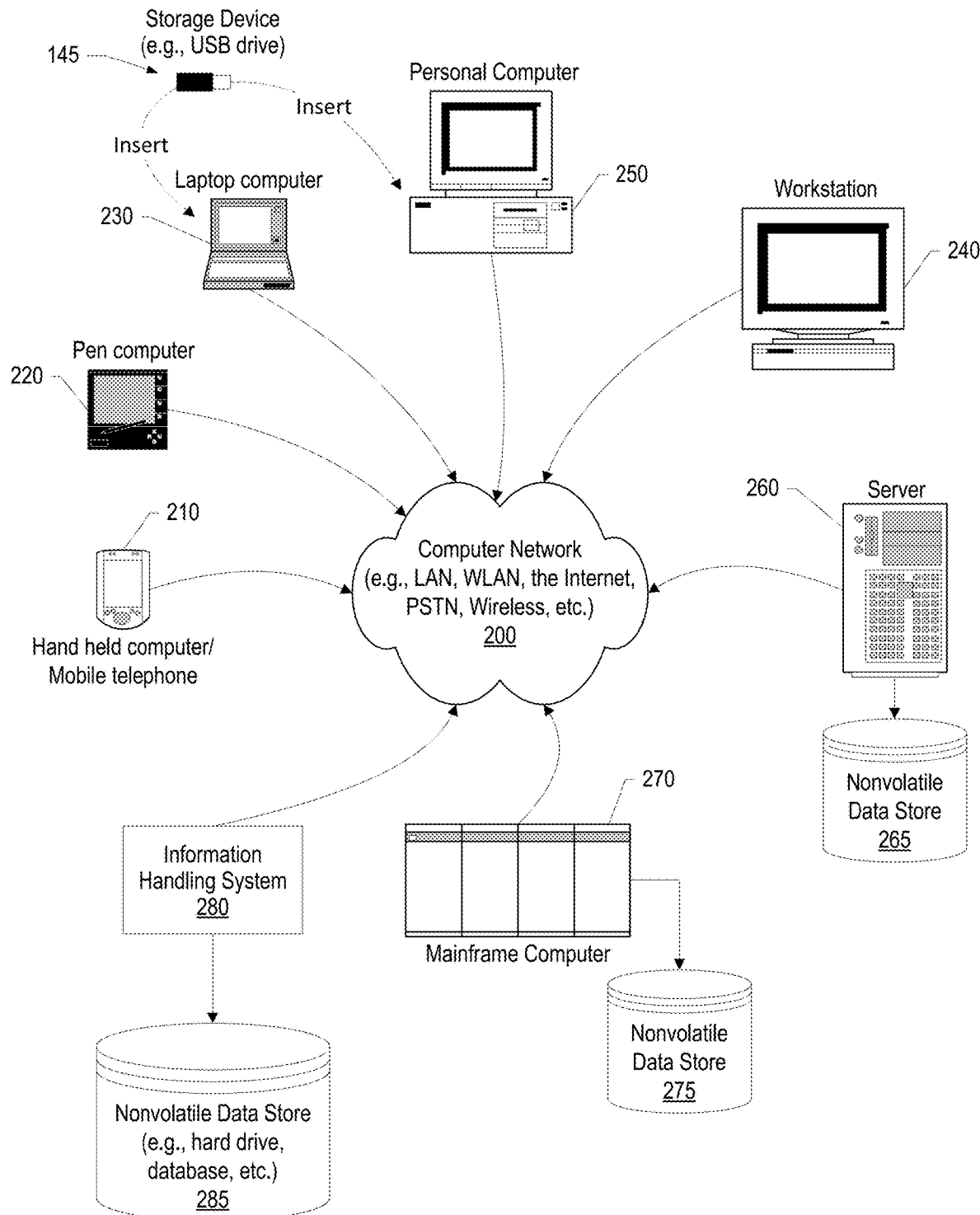
FIG. 2 is a block diagram of a processor and components of an information handling system such as those shown in FIG. 1.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
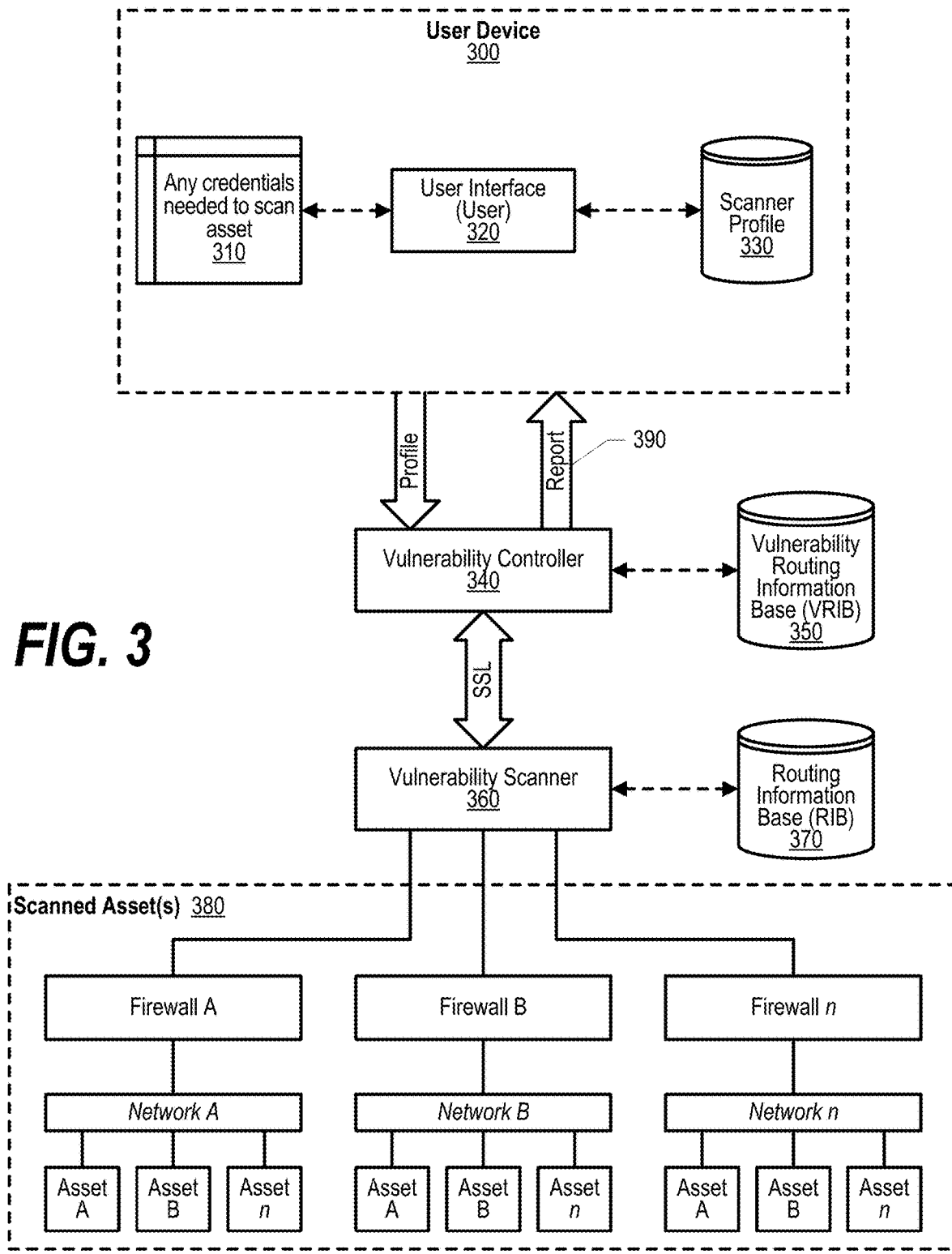
FIG. 3 is a component diagram that shows the various components included in a system that provides a vulnerability scanner that is based on a network profile.

FIG. 3 is a component diagram that shows the various components included in a system that provides a vulnerability scanner that is based on a network profile. At the top of the diagram, user device 300, depicts those components controlled or otherwise accessible from the user's device, such as a mobile computing device, a traditional computing device, or any other information handling system. These components include user interface 320 that is used by the user to request a vulnerability scan of any network resources that are accessible by the user or the user's organization. In order to access the network resources, credentials (e.g., passwords, user identifiers, etc.) may be needed to access and scan the network resources. These credentials are provided by the user and stored in memory area 310. By utilizing user interface 320, the user creates scanner profile 330 that identifies network resources to be scanned and also includes any network access data, such as credentials and the like, needed to access such network resources.

Rather than providing all of the network access data directly to a vulnerability scanner, as is done in traditional approaches, the scanner profile with the network access data is instead provided to vulnerability controller 340 that manages vulnerability scanners on behalf of the user and, through such management, limits or prevents network accessibility data from remaining at the vulnerability scanner where it might otherwise be used by malevolent individuals, such as hackers, etc. To perform its functions, vulnerability controller 340 receives a scanner profile from the user device and builds a vulnerability routing information base (VRIB) that includes routing information such as Internet Protocol (IP) addresses of scanned assets 380 as well as network access data used to access networks as well as individual network resources being scanned per the scanner profile. In one embodiment, VRIB 350 is maintained by a database management system (DBMS) so that the information can be accessed and updated using database (e.g., SQL, etc.) commands. In addition, in one embodiment VRIB 350 is encrypted so that the data is not available if a malevolent individual is able to access the vulnerability controller and the VRIB. Further, in one embodiment, communications between vulnerability controller 340 and user device 300 are over a secure communications tunnel (e.g., SSL, etc.). Likewise, communications between vulnerability controller 340 and vulnerability scanner 360 are also over another secure communications tunnel.

Vulnerability controller 340 uses the scanner profile data and routing information data from routing information base (RIB) 370 to create VRIB 350. As previously mentioned, the scanner profile data with any needed credentials is received from user device 300 while RIB 370 is received from vulnerability scanner 360. Vulnerability controller 340 can control multiple vulnerability scanners 360. In one embodiment, RIB data provided from several vulnerability scanners is incorporated into a single VRIB 350, while in another embodiment, a separate VRIB is maintained for each vulnerability scanner.

Vulnerability controller 340 instructs vulnerability scanner 360 to perform a vulnerability scan on scanned assets 380 by providing the vulnerability scanner the scanner profile data (e.g., network resources to be scanned, credential information needed to access such network resources, etc.). Vulnerability scanner 360 performs a vulnerability scan on the network resources 380 using the provided scanner profile data. Vulnerability scanner 360 prepares a vulnerability report that identifies, among other things, security vulnerabilities that may exist with one or more of the network resources 380. This vulnerability report is transmitted from the vulnerability scanner back to the vulnerability controller and the scanner profile data that was received from the vulnerability controller is deleted (e.g., wiped, etc.) from the vulnerability scanner's memory. In addition, once successfully transmitted, the vulnerability report is also deleted from the vulnerability scanner's memory. The deletions are performed so that if a malevolent individual somehow accesses the vulnerability scanner, such individual will not obtain network resource data, such as credentials and other network access data, that might be used to access and potentially harm one or more of the scanned assets 380.

Once the vulnerability controller receives the vulnerability results from the vulnerability scanner, the vulnerability controller generates a vulnerability report to user device 300 using the secure communications tunnel that was established between user device 300 and vulnerability controller 340. Once successfully transmitted to user device 300, the vulnerability controller can delete the vulnerability report from its memory.

Figure 4:
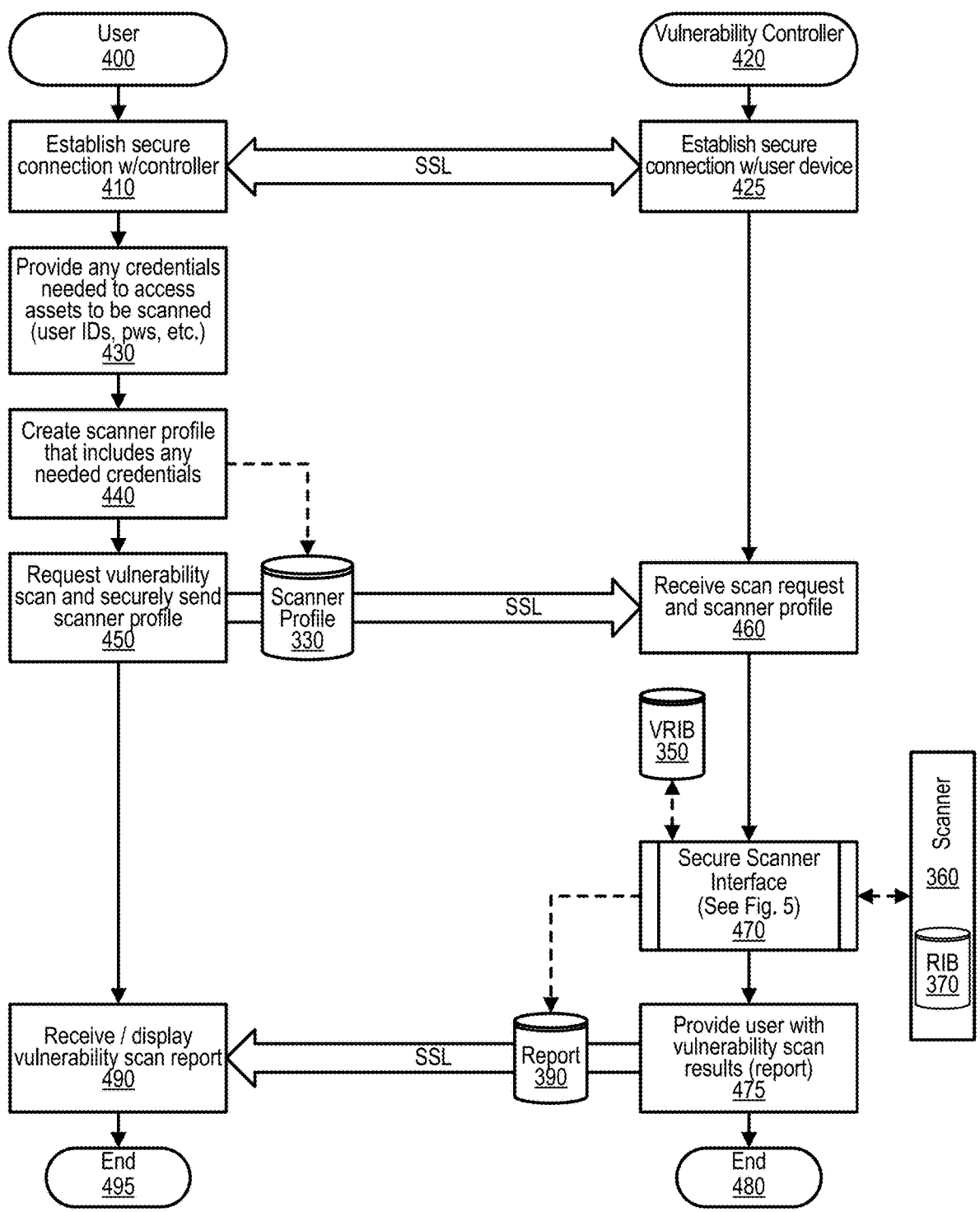
FIG. 4 is a depiction of a flowchart showing the interaction between a user process and a vulnerability control process.

FIG. 4 is a depiction of a flowchart showing the interaction between a user process and a vulnerability control process. FIG. 4 shows interaction between user processing, shown commencing at 400, and shows vulnerability controller processing commencing at 420. At step 410, the user processing establishes a secure connection (e.g., SSL, etc.) with the vulnerability controller. At step 425, the vulnerability controller process is shown establishing its secure connection with the user device. At step 430, the user device process provides any credentials that are needed to access the network resources that are to be scanned (e.g., user identifiers, passwords, etc.). At step 440, the user device process creates scanner profile that includes any needed credentials that were provided at step 430. The scanner profile data that includes the network resources that the user wishes to scan and the network access data, including any provided credential information, is stored in data store 330. At step 450, the user device process requests a vulnerability scan by securely sending the scanner profile to the vulnerability controller over the secure connection.

Returning to vulnerability controller processing, at step 460, the vulnerability controller process receives the scan request and the scanner profile from the user device. At predefined process 470, the vulnerability controller process performs the Secure Scanner Interface routine (see FIG. 5 and corresponding text for processing details). This routine interfaces with vulnerability scanner 360, creates the vulnerability routing information base (VRIB 350) using routing data and data from the scanner profile, instructs the vulnerability scanner to perform the vulnerability scan, receives the scan results from the vulnerability scanner, and readies vulnerability scan report 390. At step 475, the vulnerability controller process transmits the vulnerability scan report stored in data store 390 back to the user device process with vulnerability controller processing thereafter ending at 480.

Returning to user device processing, at step 490, the user device process receives and displays, or otherwise provides, the vulnerability scan report that was received from the vulnerability controller back to the user of the user device, such as by utilizing a user interface. User device processing thereafter ends at 495.

Figure 5:
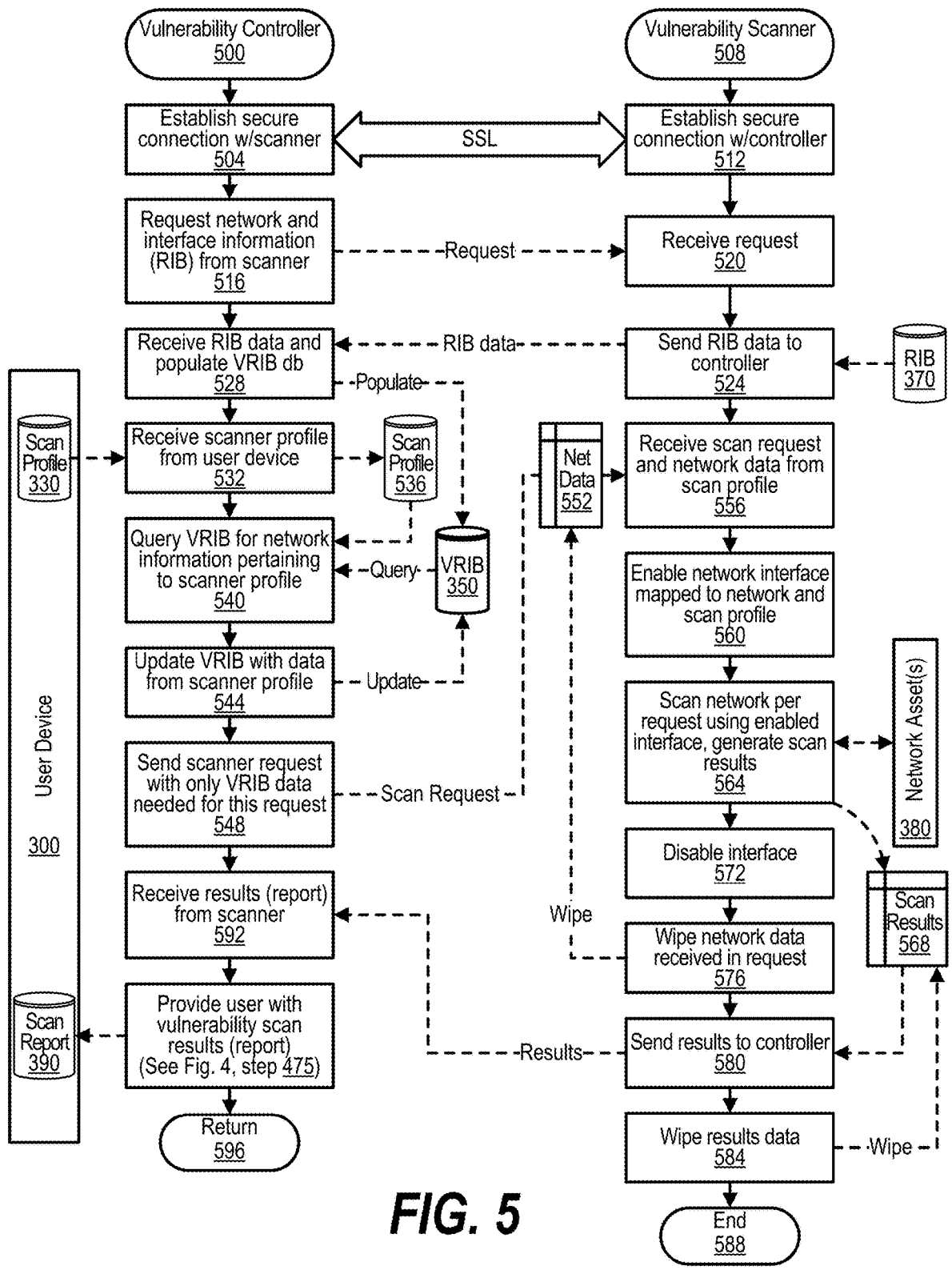
FIG. 5 is a depiction of a flowchart showing the interaction between the vulnerability control process and a vulnerability scanner process.

FIG. 5 is a depiction of a flowchart showing the interaction between the vulnerability control process and a vulnerability scanner process. FIG. 5 shows processing performed with the vulnerability controller interacting with the vulnerability scanner with the vulnerability controller processing shown commencing at 500 and the vulnerability scanner processing shown commencing at 508. At step 504, the vulnerability controller process establishes a secure connection (e.g., SSL, etc.) with the vulnerability scanner process with the vulnerability scanner process shown also establishing the secure connection with the vulnerability controller at step 512.

At step 516, the vulnerability controller process requests network and interface information from the vulnerability scanner process. The network and interface information is also referred to as the routing information base (RIB) that is stored in data store 370 accessible to the vulnerability scanner. At step 520, the vulnerability scanner process receives the request for the network and interface information. At step 524, the vulnerability scanner retrieves the network and interface information from RIB data store 370 and sends the network and interface information back to the vulnerability controller.

Returning to vulnerability controller processing, at step 528, the process receives the network and interface information (RIB data) and uses the information to populate the vulnerability routing information base (VRIB) stored in data store 350. In one embodiment, the VRIB is managed by a database management system (DBMS) and is updated and searched using database commands (e.g., Structured Query Language (SQL) commands, etc.). At step 532, the vulnerability controller process receives the scanner profile data from user device 300. Scanner profile 330 is sent from the user device and received at the vulnerability controller and stored as scanner profile 536 with the scanner profile including the network resources that the user wishes to have scanned along with any network access data (e.g., credentials, etc.) needed to access such network resources.

At step 540, the vulnerability controller process queries the VRIB for the network information that pertain to the scanner profile. In a database implementation, the query is a database (e.g., SQL, etc.) query. At step 544, the vulnerability controller process updates the VRIB with data received from the scanner profile. The VRIB is updated with any network access data (credentials, etc.) needed to access the network resources identified in the scanner profile. At step 548, the vulnerability controller process sends a scanner request to the vulnerability scanner with the scanner request only including the VRIB data that is needed to perform the vulnerability scans set forth in the vulnerability profile.

Returning to vulnerability scanner processing, at step 556, the vulnerability scanner process receives the scan request from the vulnerability controller with the scan request including any needed network access data that was identified by the vulnerability controller in the scan profile. At step 560, the vulnerability scanner process enables a network interface that is mapped to the network subject to the vulnerability scan with scan profile data (e.g., credentials, etc.) being used to complete the interface. At step 564, the vulnerability scanner process scans the network resource(s) 380 for vulnerabilities per the scan request by using the enabled interface.

The vulnerability scan that is performed generates vulnerability scan results that are stored in memory area 568. After the vulnerability scan is performed, at step 572, the vulnerability scanner process disables the network interface that was used to scan the network resource(s). At step 576, the vulnerability scanner process wipes (deletes) the network access data that received in request so that the network access data is no longer in the vulnerability scanner's memory. At step 580, the vulnerability scanner process sends the scan results from memory area 568 back to the vulnerability controller from which the vulnerability scan request was received. After the scan results are successfully sent back to the vulnerability controller then, at step 584, the vulnerability scanner process wipes the scan results data from the vulnerability scanner's memory. Vulnerability scanner processing thereafter ends at 588.

Returning to vulnerability controller processing, at step 592, the vulnerability controller process receives the scan results (vulnerability report) generated by the vulnerability scanner from the vulnerability controller. The vulnerability controller then provides user device 300 with the scan results (vulnerability report) which is shown in FIG. 4 at step 475. Processing then returns to the calling routine (see FIG. 4) at 596.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an", the same holds true for the use in the claims of definite articles.

What is claimed is:

1. A method implemented by an information handling system that includes a processor and a memory accessible by the processor, the method comprising: receiving, at a vulnerability controller, a user scan request from a user and a routing information base from a vulnerability scanner: populating, at the vulnerability controller, a vulnerability routing information base that includes data from the routing information base; updating the vulnerability routing information base with data from a scan profile associated with the user; generating, at the vulnerability controller, a scan request, wherein the scan request includes a set of network access data from the vulnerability routing information base limited to the user scan request; sending the scan request from the vulnerability controller to the vulnerability scanner; receiving, by the vulnerability scanner, the scan request, wherein the set of network access data included in the scan request pertains to a set of one or more network accessible resources, and wherein the set of network access data is stored in the memory; accessing, by the vulnerability scanner, the set of network accessible resources using the set of network access data; performing a vulnerability scan of the network accessible resources; releasing the access to the set of network accessible resources; and deleting the set of network access data from the memory.

2. The method of claim 1 further comprising wherein the scan profile associated with the user includes a set of credentials used to access the set of one or more network accessible resources; and securely sending the scan profile from the vulnerability controller to the vulnerability scanner, wherein the set of network access data is included in the scan profile.

3. The method of claim 2 further comprising: receiving, at the vulnerability controller, a vulnerability report from the vulnerability scanner; and providing the vulnerability report from the vulnerability controller to the user.

4. The method of claim 1 further comprising: after completion of the vulnerability scan, disabling one or more network interfaces used to access to the set of network accessible resources, wherein the deletion of the network access data includes wiping the memory where the network access data was stored; sending, over a secure connection, the vulnerability report from the vulnerability scanner to the vulnerability controller; and wiping the vulnerability report from the memory of the vulnerability scanner.

5. The method of claim 1 wherein the vulnerability scanner is one of a plurality of vulnerability scanners and wherein the vulnerability controller controls usage of each of the plurality of vulnerability scanners.

6. An information handling system comprising: one or more processors; a memory coupled to at least one of the processors; and a set of computer program instructions stored in the memory and executed by at least one of the processors in order to perform actions comprising: receiving, at a vulnerability controller, a user scan request from a user and a routing information base from a vulnerability scanner; populating, at the vulnerability controller, a vulnerability routing information base that includes data from the routing information base; updating the vulnerability routing information base with data from a scan profile associated with the user; generating, at the vulnerability controller, a scan request, wherein the scan request includes a set of network access data from the vulnerability routing information base limited to the user scan request; sending the scan request from the vulnerability controller to the vulnerability scanner; receiving, by the vulnerability scanner, the scan request wherein the set of network access data included in the scan request pertains to a set of one or more network accessible resources, and wherein the set of network access data is stored in the memory; accessing, by the vulnerability scanner, the set of network accessible resources using the set of network access data; performing a vulnerability scan of the network accessible resources; releasing the access to the set of network accessible resources; and deleting the set of network access data from the memory.

7. The information handing system of claim 6 wherein the scan profile associated with the user includes a set of credentials used to access the set of one or more network accessible resources, and wherein the actions further comprise: securely sending the scan profile from the vulnerability controller to the vulnerability scanner, wherein the set of network access data is included in the scan profile.

8. The information handing system of claim 7 further wherein the actions further comprise: receiving, at the vulnerability controller, a vulnerability report from the vulnerability scanner; and providing the vulnerability report from the vulnerability controller to the user.

9. The information handing system of claim 6 further wherein the actions further comprise: after completion of the vulnerability scan, disabling one or more network interfaces used to access to the set of network accessible resources, wherein the deletion of the network access data includes wiping the memory where the network access data was stored; sending, over a secure connection, the vulnerability report from the vulnerability scanner to the vulnerability controller; and wiping the vulnerability report from the memory of the vulnerability scanner.

10. The information handing system of claim 6 wherein the vulnerability scanner is one of a plurality of vulnerability scanners and wherein the vulnerability controller controls usage of each of the plurality of vulnerability scanners.

11. A computer program product stored in a computer readable storage medium, wherein the actions further comprise computer program code that, when executed by an Information handing system, performs actions wherein the actions further comprise: receiving, at a vulnerability controller, a user scan request from a user and a routing information base from a vulnerability scanner; populating, at the vulnerability controller, a vulnerability routing information base that includes data from the routing information base; updating the vulnerability routing information base with data from a scan profile associated with the user; generating, at the vulnerability controller, a scan request, wherein the scan request includes a set of network access data from the vulnerability routing information base limited to the user scan request; sending the scan request from the vulnerability controller to the vulnerability scanner; receiving, by the vulnerability scanner, the scan request, wherein the set of network access data included in the scan requests pertains to a set of one or more network accessible resources, and wherein the set of network access data is stored in the memory; accessing, by the vulnerability scanner, the set of network accessible resources using the set of network access data; performing a vulnerability scan of the network accessible resources; releasing the access to the set of network accessible resources; and deleting the set of network access data from the memory.

12. The computer program product of claim 11 wherein the scan profile associated with the user includes a set of credentials used to access the set of one or more network accessible resources, and wherein the actions further comprise: securely sending the scan profile from the vulnerability controller to the vulnerability scanner, wherein the set of network access data is included in the scan profile.

13. The computer program product of claim 12 further wherein the actions further comprise: receiving, at the vulnerability controller, a vulnerability report from the vulnerability scanner; and providing the vulnerability report from the vulnerability controller to the user.

14. The computer program product of claim 11 further wherein the actions further comprise: after completion of the vulnerability scan, disabling one or more network interfaces used to access to the set of network accessible resources, wherein the deletion of the network access data includes wiping the memory where the network access data was stored; sending, over a secure connection, the vulnerability report from the vulnerability scanner to the vulnerability controller; and wiping the vulnerability report from the memory of the vulnerability scanner.

15. The computer program product of claim 11 wherein the vulnerability scanner is one of a plurality of vulnerability scanners and wherein the vulnerability controller controls usage of each of the plurality of vulnerability scanners.

* * * * *